United States Patent Office.

JOHN ALTHOUSE, OF EAST COCALICO TOWNSHIP, PENNSYLVANIA.

*Letters Patent No. 63,195, dated March 26, 1867.*

---

IMPROVED COMPOUND FOR THE CURE OF GLANDERS, &c., IN HORSES.

---

*The Schedule referred to in these Letters Patent and making part of the same.*

---

TO ALL WHOM IT MAY CONCERN:

Be it known that I, JOHN ALTHOUSE, of East Cocalico Township, in the county of Lancaster, and State of Pennsylvania, have invented a new and improved Compound for the Cure of Glanders and Farcy in Horses; and I do hereby declare that the following is a full and exact description of the articles employed, reference being had to the references given, where the same are illustrated and fully described at large, separately, in their vegetable growth, locality, and properties, so far as known to the authors.

I may be allowed to state that the glanders is the *opprobrium medicorum*, for hitherto no attempts have succeeded in the cure of more than a few cases. By some peculiar anomaly in the constitution of the horse, although conclusive proofs are not wanting that this and farcy are modifications of one disease, and can each generate the other, yet the one is deemed incurable, while the other is cured every day. It is not my purpose to explain the cause of glanders, nor to designate the marks by which it is known, neither to enter upon its treatment as recommended by White, Clark, Blain, and others. The treatment is acknowledged by competent writers to be so uncertain that it is hardly worth making an effort, unless when the extreme value of the horse or the love of experiment leads to it. Such was my experience, which prompted me to compound and administer the remedy herein to be fully set forth and described, which did not only save me a valuable horse, but has been found equally efficacious in numerous other cases; so much so that the public demands my secret, and before yielding it up, so that my confidence can be abused, I desire to protect myself, so far at least as to being the originator and inventor of the same.

To enable others to collect and compound my remedy, I will now describe the several plants used and mode of making and administering the combination, which consists simply of three articles, the roots of *Convolvulus* (or *Ipomœa*) *panduratus*, *Daucus carota*, and the berries of *Piper nigrum*; or, in plain English, black pepper, root of wild carrot, and wild potato, combined, when powdered, in equal proportions by weight. More fully described as follows:

The *Convolvulus* (*Ipomœa*) *panduratus* has a twining stem, cordate, or fiddle-shaped, (panduriform,) acuminate, round-lobed leaves, with flowers, 1–5, corolla open-funnel form. Described and figured fully in Griffith's Medical Botany—Lea & Blanchard, 1847—page 476; Sp. Pl., 219; Barton, Veg. Mat. Med., i, 249; Rafinesque, Med. Flor., i, 123; Meyer (*Ipomœa*) Prim. Esseq., 100; Lindley, Med. Flor., 396; Dr. A. Gray's various editions—in that of 1862, page 334. The common names are that of wild potato; wild rhubarb; wild jalap; mechameck; wild potato vine; man-of-the-earth. Grows in sandy fields and dry banks, from Connecticut to Illinois and southward. June to August. Stem long and stout, from a huge thick root, which often weighs ten to twenty pounds. Dr. Griffith admits (page 477) that "the real qualities of this article are not well ascertained." Drs. B. S. Barton, Harris of New Jersey, Elliott, and others, attribute to it active properties. In Good's Family Flora, and Materia Medica Botanica, &c., Article No. 24, it is compared with the valuable drugs (or roots of) jalap and scammony. It is admitted to have proved efficacious in torpid states of the intestines, in leucophlegmatic, hypochondriacal and maniacal subjects, &c. The root should be collected, for medical purposes, at the end of summer, and if to be dried ought to be cut in slices and kept in a glass jar under cover. The *Daucus carota*, or common wild carrot, growing rather too spontaneously in old fields and along the road sides, so much so as to be a troublesome weed, difficult to eradicate in certain localities, and too familiar to require a further description; besides, by reference to said Griffith's Medical Botany, page 337, or to Dr. Gray's Manual, page 152, a full description will be found, so that no one can mistake the plant. In German it is known as the *Gemeine mohre*. The wild plant or its root is more active than that of the cultivated or garden carrot, and is collected and treated as that of the *Convolvulus panduratus*, above set forth. The other ingredient is the common black pepper in daily use, (*Schwarzer pfeffer*—Ger.,) and certainly requires no further description, and is deemed superior to the use of capsicum, cubebs, or analogous condiments, which may be substituted; hence I do not confine myself to the black pepper, so that to substitute any other kind of pepper would change the compound I claim as my invention, were I to confine myself strictly to black pepper only, which I nevertheless employ in preference to any other kind. The pulverized dried root (or grated when fresh, with a slight increase in the weight) of each, say one ounce, combined with an ounce of ground black pepper, forms one dose of three ounces' weight. This is given every other day with the horse's feed, moistened ship-stuff, or the like, and continued for two or six weeks, according to the obstinacy of the case. Two weeks are usually sufficient to effect a permanent cure; sometimes four weeks are required, rarely six weeks.

The foregoing description and prescription are deemed amply sufficient, without the exhibition of specimens or drawings, to enable any one, who will choose to avail himself of the references, to collect, prepare, and use my remedy with perfect ease and perfection. I do not claim the use of the aforesaid roots and pepper for any of their known or separate properties.

What I claim as my invention or discovery, is—

The composition of my powder for the cure of glanders and farcy in horses, when combined and administered substantially in the manner specified.

JOHN ALTHOUSE.

Witnesses:
   A. D. CARPENTER,
   BARTON P. REAM.